June 14, 1938. T. GAMBLE 2,120,699
PITCHER TOP FOR JARS AND SIMILAR CONTAINERS
Filed Sept. 23, 1936
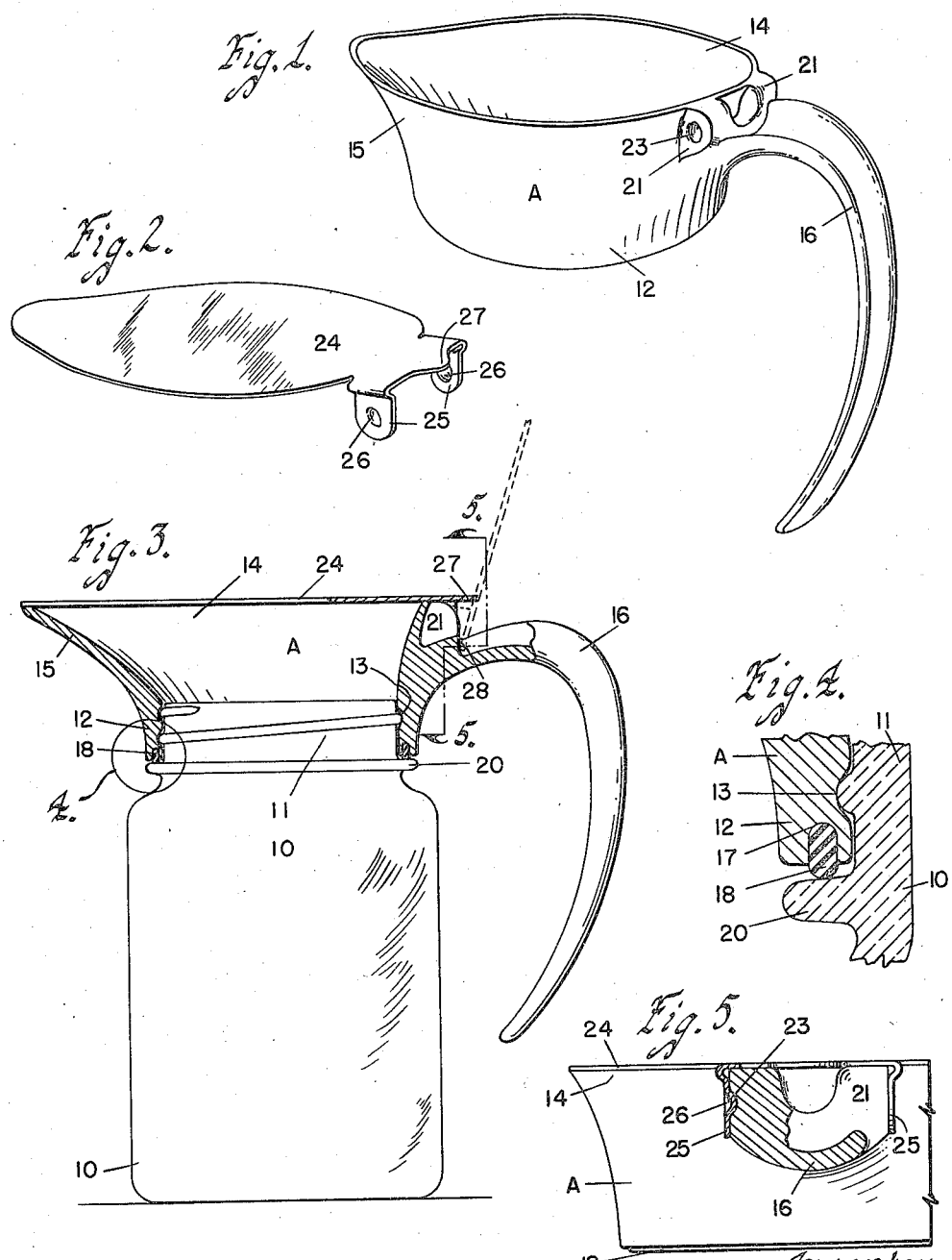
Inventor
~Theolian Gamble~
By Bair, Freeman & Sinclair
Attorneys
Witness
H. S. Munzenmier Patented June 14, 1938

2,120,699

UNITED STATES PATENT OFFICE 2,120,699

PITCHER TOP FOR JARS AND SIMILAR CONTAINERS

Theolian Gamble, Des Moines, Iowa

Application September 23, 1936, Serial No. 102,140

2 Claims. (Cl. 215—100)

The primary object of my present invention is to provide a pitcher top for fruit jars and other containers.

It is my particular purpose to provide a pitcher top, comprising a substantially annular member having a lower portion, internally screw-threaded to fit the threads on an ordinary fruit jar, and having an upper portion, generally in the form of a slightly flaring flange with a projecting lip for pouring at one side and a suitable rigid handle at the opposite side.

A further object is to provide in connection with such a top a snap-on cover which can be swung pivotally, when installed, from closed to open position and vice versa.

Another object is to provide such a pitcher top, which can be readily mounted on a jar or the like in such a way as to avoid any leakage.

Another object is to provide in connection with such a pitcher top a readily detachable snap-on fruit juicer and strainer.

Still another object is to provide a simple and inexpensive and readily attachable and removable carrier bail, for use in conjunction with such a pitcher top.

With these and other objects in view, my invention consists in the construction, arrangement and combination of the various parts of my pitcher top, whereby the objects contemplated are attained, as hereinafter more fully set forth, pointed out in my claims, and illustrated in the accompanying drawing, in which:

Figure 1 is a perspective view of a pitcher top embodying my invention.

Figure 2 is a perspective view of the detachable snap-on cover.

Figure 3 is a vertical, sectional view of my cover installed on a fruit jar, parts being broken away and parts being shown in section.

Figure 4 is an enlarged, detail, sectional view illustrating the connection between the pitcher top and the jar.

Figure 5 is an enlarged, detail, sectional view taken on the line 5—5 of Figure 3.

While my pitcher top may be used with various kinds of containers, I have for purposes of illustration shown it installed on an ordinary fruit jar, indicated in the drawing by the numeral 10.

The jar has the ordinary reduced, externally threaded neck, 11. My improved pitcher top indicated generally by the reference character A has a lower, annular portion 12, which is internally screw-threaded as at 13 to fit the threads of the neck 11.

The pitcher top also has the upper slightly flared portion 14, provided at what may be called the front of the top with the projecting lip 15 for pouring.

Projecting from what may be called the rear part of the top A is a stiff handle 16 inclined upwardly away from the top and then downwardly as indicated in Figures 1 and 3 for example.

The lower end of the handle is so designed as to clear the ordinary fruit jar or container on which the top may be installed.

The pitcher top as described is perhaps best illustrated in Figure 1 of the drawing. As there shown, it is very simple, of inexpensive construction, and can be quickly and very easily installed on or removed from an ordinary fruit jar 10.

The advantages of such a pitcher top are obvious. It makes any fruit jar available for use as a pitcher. In household use, fruit jars are often employed for holding lemonade or any liquid food or drink, and by assemblying one of the pitcher tops A on such a jar, the jar can be changed into a pitcher.

Where the jars and the pitcher tops are true, no leak will occur when they are assembled. However, it is also obvious that a pitcher top may be so constructed that it can be used on a jar with the ordinary "rubber", such as is generally used on fruit jars.

I have, however, shown in the lower face of the pitcher top A, an annular groove 17 into which may be fitted part of a rubber gasket or the like 18, in such a way that the gasket projects from the top and will engage the thread or the flange 20 on the jar or container as the case may be for making a tight joint, which will not leak.

I have shown the jar 10 provided with the ordinary flange 20 commonly found on fruit jars. This flange cooperates with the gasket 18 as illustrated for instance in Figure 4.

The upper part of the top A near the handle 16 is provided with a pair of laterally spaced lugs 21, each having a recess 23. A removable cover 24 has the laterally spaced, down-turned spring ears 25, each having a central inward projection 26. The ears 25 can be snapped over the lugs 21 to cause the projections 26 to enter the recesses 23.

The parts are so constructed that the cover 24 will then be pivotally connected to the top A and can be swung into a variety of positions.

I preferably provide the top with a short rearward extension 27, which is adapted to be engaged by the thumb for manipulating the cover, and which also serves to engage the shoulder 28 on the top A to limit the upward and outward swinging movement of the cover 24.

Changes may be made in the details of the construction and arrangement of my device and in the materials used, and it is my intention to cover by my claims any modifications in form and structure or use of materials, which may be reasonably included within the scope of my invention and my claims.

I claim as my invention:

1. A pitcher top for fruit jars and the like, comprising a lower, annular, internally threaded portion, an upper smooth-surfaced slightly flaring portion, having at one side a projecting lip for pouring, said pitcher top having portions formed with recesses adjacent to said handle, a cover for said top, having spaced spring ears with projections adapted to be snapped into said recesses.

2. A pitcher top for fruit jars and the like, comprising a lower, annular, internally threaded portion, an upper smooth-surfaced slightly flaring portion, having at one side a projecting lip for pouring and at the other side a downwardly projecting handle, said pitcher top having portions formed with recesses adjacent to said handle, a cover for said top, having spaced spring ears with projections adapted to be snapped into said recesses, the internally threaded portion having a groove in its lower end, and a gasket contained in said groove.

THEOLIAN GAMBLE.